United States Patent [19]

Förster et al.

[11] 4,391,227

[45] Jul. 5, 1983

[54] FLUID-HEATING APPARATUS

[75] Inventors: Siegfried Förster, Alsdorf; Peter Quell, Aachen-Haaren; Huber Jaegers, Jülich-Welldorf, all of Fed. Rep. of Germany

[73] Assignee: Kernforschungsanlage Jülich GmbH, Jülich, Fed. Rep. of Germany

[21] Appl. No.: 253,258

[22] Filed: Apr. 13, 1981

[30] Foreign Application Priority Data

Apr. 14, 1980 [DE] Fed. Rep. of Germany ....... 3014245

[51] Int. Cl.³ .............................................. F22B 5/00
[52] U.S. Cl. ....................................... 122/16; 122/43; 126/116 R; 431/215
[58] Field of Search .................... 122/16, 14, 43, 179; 126/350 R, 116 R, 361, 106; 431/5, 215

[56] References Cited

U.S. PATENT DOCUMENTS 3,556,701 1/1971 Momoda et al. ................. 431/5 X
4,271,789 1/1981 Black ............................ 122/16

Primary Examiner—Edward G. Favors
Attorney, Agent, or Firm—Karl F. Ross; Herbert Dubno

[57] ABSTRACT

A fluid-heating apparatus comprises a ceramic burner head formed with narrow passages which alternate with one another for fuel and a combustion sustaining medium such as air, the slit-like passages opening into a combustion chamber at which combustion of the fuel-/air mixture occurs. Downstream of this combustion chamber is a ceramic recuperator likewise formed with slit-like passages, the hot combustion gases traversing some of these recuperator passages while the fluid medium to be heated is passed through others of these passages so that heat exchange is effected through the thin ceramic walls supporting the slit-like passages of the ceramic recuperator.

13 Claims, 4 Drawing Figures

4,391,227

FLUID-HEATING APPARATUS

CROSS REFERENCES TO RELATED APPLICATIONS

The present application is related to the concurrently filed copending application Ser. No. 253,296 filed Apr. 13, 1981 (abandoned and replaced by Ser. No. 254,092 of Apr. 14, 1981) filed by two of the present joint inventors and dealing with a system for heating utility water and space heating appliances such as radiators. The invention is also related to the commonly assigned copending applications Ser. No. 100,634 of Dec. 5, 1979 and Ser. No. 134,797 of Mar. 28, 1980 as well as to application Ser. No. 250,768 filed Apr. 3, 1981; now abandoned and entitled Ceramic Burner Head.

FIELD OF THE INVENTION

Our present invention relates to a heating device and, more particularly, to a heating device having a ceramic burner for gaseous or liquid fuels downstream of which a ceramic recuperator is provided to enable the abstraction of heat from combustion gases formed by the burner, e.g. to heat a fluid.

BACKGROUND OF THE INVENTION

Systems which are provided with a burner adapted to combust a fuel/air mixture in a combustion chamber and having a recuperator or heat exchanger in which another fluid medium is heated by indirect heat exchange with the combustion gases from the combustion chamber before these gases are discharged, are commercially available in a varity of sizes and configurations and for many purposes.

For example, the principle described is used in boilers for the generation of hot water for home heating purposes or industrial purposes, in furnaces for the heating of air, e.g. in space heaters, for water heaters and, indeed, for practically any purpose in which a heated fluid is desired.

It is, however, difficult to balance the various factors which enter into the design of such heating installations. For example, for efficient heating of the fluid it is desirable to abstract heat from the combustion gases until these gases are reduced in temperature to below the dew point. This, however, can create significant corrosion problems because the combustion gases resulting from the burning of the fossil fuels usually contain acidic gases which are activated as the temperature drops below the dew point to produce corrosive acids.

On the other hand, if the heat exchange is effected so that the temperature is not reduced below the dew point, a portion of the sensible heat of the combustion gases and of the thermal energy generated by the combustion process may be lost.

Furthermore, commercial units of prior-art types are seldom compact or of such small size as to enable them to be conveniently used for home heating applications for the heating of domestic hot water supplies or the like with very high efficiencies.

OBJECTS OF THE INVENTION

It is the principal object of the present invention to provide a heating system, especially for the efficient heating of fluids such as a domestic space heating fluid and/or domestic hot water, which avoids the disadvantages of earlier systems.

Another object of the invention is to provide a heating unit which is a highly compact and relatively inexpensive construction but which can effect combustion at high temperatures and generate hot gases of elevated temperatures with efficient recovery of energy therefrom.

Yet another object of our invention is to provide a compact unit for the purposes described which will allow recovery of heat from the combustion gases to the point that the temperature of the combustion gases can be reduced below the dew point of the combustion gases without engendering corrosion problems as described.

It is also an object of this invention to extend the principles of the commonly assigned copending applications mentioned above.

SUMMARY OF THE INVENTION

These objects and others which will become more apparent hereinafter are attained, in accordance with the present invention, in a unique combination of a ceramic head and a ceramic recuperator which maximizes the heat recovered from the combustion gases generated by combustion of fuel with air at the mouth of the burner head and enables the combustion gases to be cooled below their dew point without creating corrosion problems and with an exceptionally high efficiency.

More particularly, the unit of the present invention comprises a ceramic burner head, e.g. as described in applications Ser. No. 100,634 and Ser. No. 134,797, as well as in application Ser. No. 250,768, of the type having mutually parallel slit-shaped flow passages formed in a unitary ceramic burner head body with fuel passages alternating with passages for the oxidizing agent or the combustion-sustaining agent, e.g. air, the air and fuel passages being separated by thin ceramic partitions enabling heat exchange between them, diffusion of the fuel into the air passages and/or evaporation of a liquid fuel into the air passages when these partitions are porous, utilizing the principles of these copending applications.

According to the invention, the burner mouth opens into a combustion chamber which can also be defined by ceramic walls, this combustion chamber, in turn, communicating with slit-like passages in a ceramic recuperator body. These passages can extend the full length of the recuperator body and can be equal in number to the fuel or air passages of the burner head or of a differing number and width, the combustion chamber affording uniform distribution of the combustion gases to the slit-like passages of the ceramic recuperator body.

According to an important feature of the invention the combustion gas passages of this body alternate with or flank via ceramic partitions unitary with the ceramic recuperator body, other slit-like passages through which a fluid to be heated is passed. The fluid to be heated preferably is passed in a counterflow to the combustion gases so that the indirect heat exchange through the ceramic recuperator partitions transfers heat to this fluid.

The oxidizing agent and the fuel can be passed in concurrent (uniflow) directions through the respective slit-like passages to the burner mouth and are discharged at this mouth in an ignitible mixture. Any conventional ignitible igniter, e.g. sparking electrodes, can be provided in the combustion zone and the result is a short flame region immediately downstream of the burning mouth.

The use of a ceramic recuperator in combination with a ceramic burner head and a combustion chamber which can be defined by ceramic walls, permits the temperature in the combustion chamber to be maintained extremely high, e.g. at levels above 1000° C. and the combustion gases to flow into the corresponding passages of the recuperator body at temperatures in excess of 1000° C. without damage of the parts of the device because of the refractory nature of the ceramic bodies.

However, the combustion gases can be cooled below their dew point as they traverse the recuperator since there is no danger of corrosion to the ceramic material and any liquid which is formed can be carried away without difficulty.

Ceramic burner heads of the type which may be used in accordance with the present invention can also be found in German patent document No. 28 53 309 as well as in German Pat. No. 2 707 290.

According to a further feature of the invention, the burner head and the recuperator are connected together into a unitary ceramic block, e.g. by bonding bodies formed with the slit-like passages and constituting the burner heads and the recuperator between a pair of ceramic plates which can also define two opposite walls of the combustion chamber.

The entire heating unit thus is in the form of an easily handled compact monolithic structure which occupies significantly smaller space than earlier devices of a similar output.

To minimize heat loss from the combustion chamber, the walls of the chamber can be formed of thermally insulating plates of a porous ceramic material. These heat insulating plates may be provided as internal or external layers lining the walls of the combustion chamber.

According to yet another feature of the invention the recuperator is constructed such that a portion of the burner air is bypassed through selected passages in the recuperating body for preheating by indirect heat exchange with the combustion gases.

This preheating of the combustion air has been found to be especially effective when liquid fuels are used since the thermal energy carried by the combustion air can be exploited to promote evaporation of the fuel.

The passages or the medium to be heated, apart from being subdivided to allow heating of the combustion air as described above, can additionally or alternatively be subdivided so that different fluids are heated in, for example, successive zones of the recuperator.

It this case, the recuperator can be advantageously divided into two heat exchange zones traversed in succession by the hot combustion gas. The first zone, i.e. the zone proximal to the combustion chamber, can be used for space heating purposes in this region, fluid heating passages can be traversed by their domestic heating fluid, e.g. water in the case of a hot water circulating home heating system. In the next heat exchange zone in which the heating gas is brought to a temperature below its dew point, the fluid-heating passages can be traversed by domestic hot water for utility purposes.

It has been found to be advantageous to avoid the boiling of the home-heating fluid and to provide increased heat exchange for this fluid by providing at least toward the outlet side of each of the fluid-heating passages of the first zone the means for increasing the path length of the heating water, e.g. in the form of baffles defining a meandering path with cross flow heating; these baffles are located at the side of the recuperator body at which the hot gases enter the hot gas passages.

It has also been found to be advantageous to provide wall supports in the fluid-heating passages or channels, these supports being spaced apart in the height of each chamber and being formed at least in the vicinity of the inlet and outlet for the fluid to be heated with apertures enabling the fluid to pass beyond the support, as well as wall supports in the gas-cooling passages or channels.

This arrangement has the advantage that it allows a considerable pressure differential to be sustained between the combustion gas and the fluid to be heated, i.e. cross the partition separating the slit-like channels for the combustion gas and the fluid to be heated.

The system of the present invention can also be used for the combustion of dangerous, e.g. carbon monoxide-containing or noxious $H_2S$-containing gaseous fluids in which case the recuperator can in part be used to preheat the dangerous or noxious gases which are to be burned up. In this case the preheating zone for the gases to participate in the combustion process may also be formed with a flow path for the heating of utility water. The dangerous gas is preferably introduced uniformly over the flame front at the mouth of the burner head and in the burner chamber. The passages for this purpose are thus also the aforedescribed slit-like channels formed in the ceramic body.

The device of the invention thus allows dangerous gases to be preheated before they enter the combustion chamber and since the ceramic material forming the recuperator-burner head can be silicon nitride; in this case even highly agressive and corrosive gases can be burned. The use of a single unit in which the dangerous gases are preheated and water is heated for utility purposes enables the system to be highly compact with maximum heat utilization.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
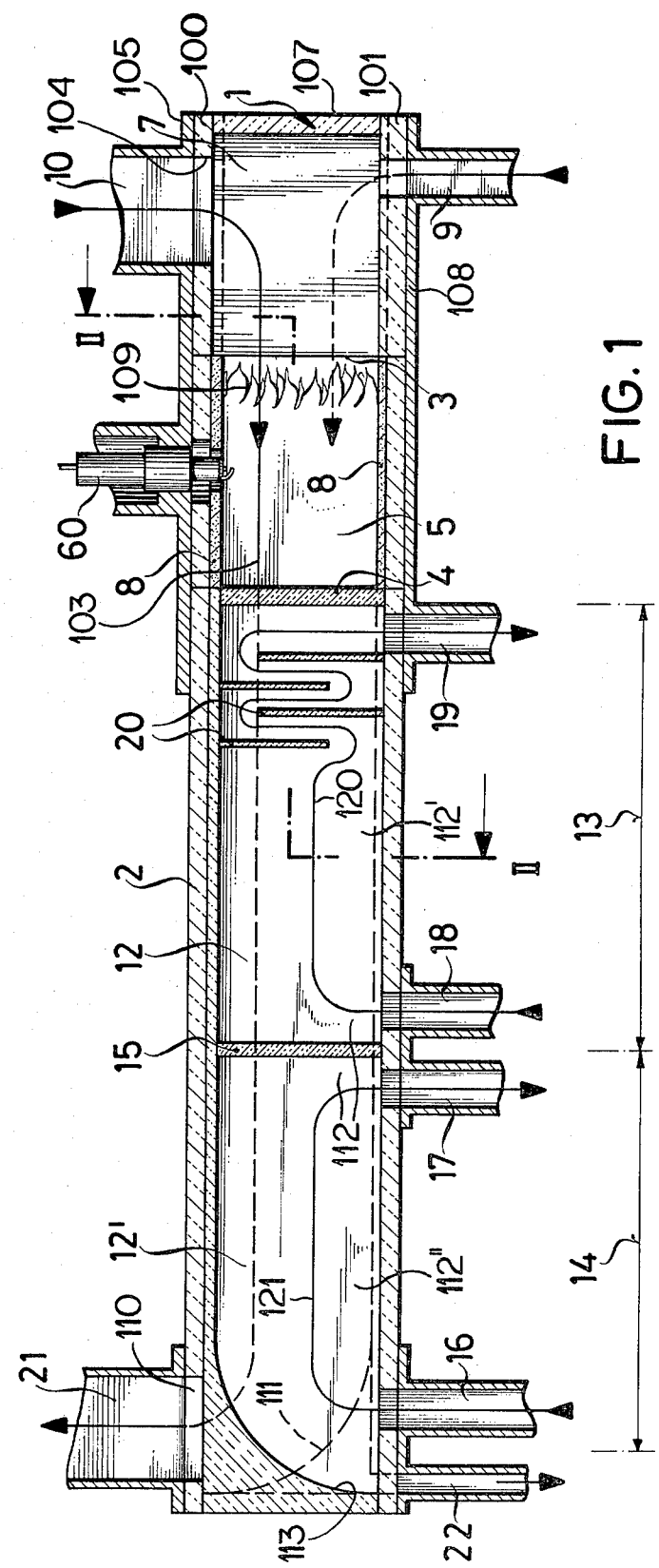
FIG. 1 is a longitudinal section through a heating unit with a ceramic burner head, a ceramic recuperator and two heat exchange zones according to the invention, the section being taken along the plane represented by the section line I—I in FIG. 2.
Figure 2:
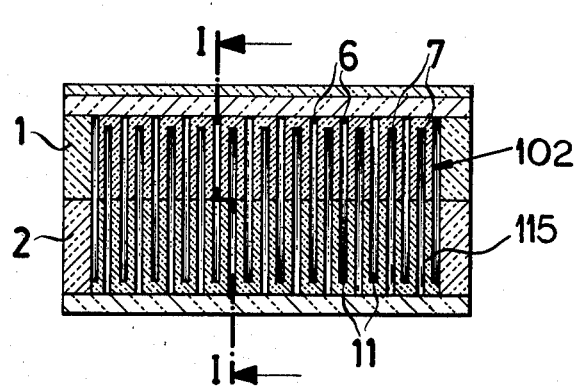
FIG. 2 is a transverse section partly through the burner head and partly through the recuperator on FIG. 1 along the section line II—II thereof.

The burner head shown in FIGS. 1 and 2 at 1 is comprised of ceramic material and can be formed as a block of such material provided with slits which extend parallel to one another and alternately open on opposite sides of the block where the block is closed by upper and lower plates 100 and 101, also of ceramic material. The plates 100 and 101 may be bonded to the body 102 of ceramic material forming the burner head by a ceramic slip to ensure ceramic monolithic bonding.

The plates 100 and 101 extend the full length of the device and also are bonded to and receive between them a similarly shaped ceramic recuperator 2 so that the entire assembly of the burner head, recuperator and a combustion chamber 5 between the two slit blocks forms a single unitary ceramic structure.

The relatively short combustion chamber 5 is thus disposed between the burner mass 3 of the burner head 1 and the hot gas inlet side 4 of the recuperator 2. The hot gas flow path through the burner chamber is represented by arrow 103 and through the two zones of the recuperator at 12 and 12′.

An igniter 60 projects into the combustion chamber to generate a spark or other electrical discharge for initially igniting the combustible mixture.

As described, the burner head 1 and the recuperator 2 are both formed with a multiplicity of parallel flow passages of slit-shaped cross sections which are uniformly distributed over the width of the respective bodies (FIG. 2) and are shown to have identical distributions in the upper and lower halves of this figure.

These flow passages include channels 6 for the fuel which is delivered to the slits of the body 1 which opens upwardly through an elongated distribution aperture 106 in the plate 101, the aperture 104 communicating with a duct 10 for the air in a metallic plate 105 bonded to the plate 100.

The downwardly open slits of the burner head form channels 7 which communicate with the slit-like opening 104 in the plate 100 underlying the block forming the burner head.

All of the channels are closed at their right hand side as represented at 107 and the combustion air is delivered by a duct 10 formed on a metal plate 105 bonded to the ceramic plate 100.

At the burner mouth 3, the fuel and the air intensively mix and in a short flame front 109 generate a hot combustion gas within the chamber 5 which can effectively be filled with this flank if desired.

To minimize heat losses the interior of the combustion chamber 5 is lined with insulating plates 8 of gas permeable porous ceramic material. The ducts 9 and 10 open laterally into the burner head 1.

The ceramic recuperator 2 is formed with flow passages 11 for the hot gas in the form of upwardly open slits which are covered by the plate 100 over substantially the entire length of the recuperator body 2, except at the left hand thereof where these channels open into an elongated aperture 110 of plate 100. This aperture is connected to a duct 21 at which the exhaust gas is discharged.

Alternating with the passages 11 are slit-like passages 112 for the medium to be heated. As can be seen in FIG. 1, the passages 112 are closed at their left hand end by the walls 113 while the passages 11 are closed at this end by the wall 111.

In addition, the passages 112 are such subdivided by a partition 15 so that the recuperator has two heating zones 13 and 14. In the recuperator, the heat is transferred through each wall 115 (FIG. 2) thereby heating the medium in the channels 112 with heat transferred from the combustion gas from channels 11.

In the embodiment of FIGS. 1 and 2, the first heat exchange zone 13 of the recuperator surface to heat the circulating heating fluid is space heating, i.e. water in the case of hot water heating. The water is introduced into the passages 112′ which are formed between the partitions 15 and the walls 4 in the channels 112 as represented by the arrow 120, i.e. in counterflow to the hot gas stream.

In the second heat exchange zone 14 downstream from the first in the direction of hot gas flow, the utility water for the house can be heated. In this case as well, the passages 112″ are traversed by the water in the direction of arrow 121 in counterflow to the hot gas.

Thus a water inlet 16 is mounted upon the unit to communicate with the downstream ends of all of the channels 112 while a hot water outlet 17 downstream of the partitions 15 is connected to the hot-water reserve tank.

On the opposite side of the partitions 15 the circulating heating water is introduced via an inlet 18 connected to the return side of the circulating hot water system. The feed side of this system is connected to the outlet 19 which communicates with the channels 112 immediately downstream of the walls 4 which separate these channels from the combustion chamber 5.

To avoid water evaporation at the region of outlet 19, the passages 112 are provided at least in the region of the water outlets with baffles 20 extending alternately into the passages from opposite sides.

All of the feed and discharge fittings communicate laterally with the ceramic unit.

Since the hot exhaust gases on the way to the discharge stack 21 are cooled below their dew point temperatures, condensate can form in the passages 11 traversed by the combustion gases and this condensate can be discharged by a condensate outlet 22.

The heating device shown in FIGS. 1 and 2 can supply useful energy at a level of at least several kilowatts while a total length of the ceramic unit including the burner head and the recuperator is 55 cm.

Figure 3:
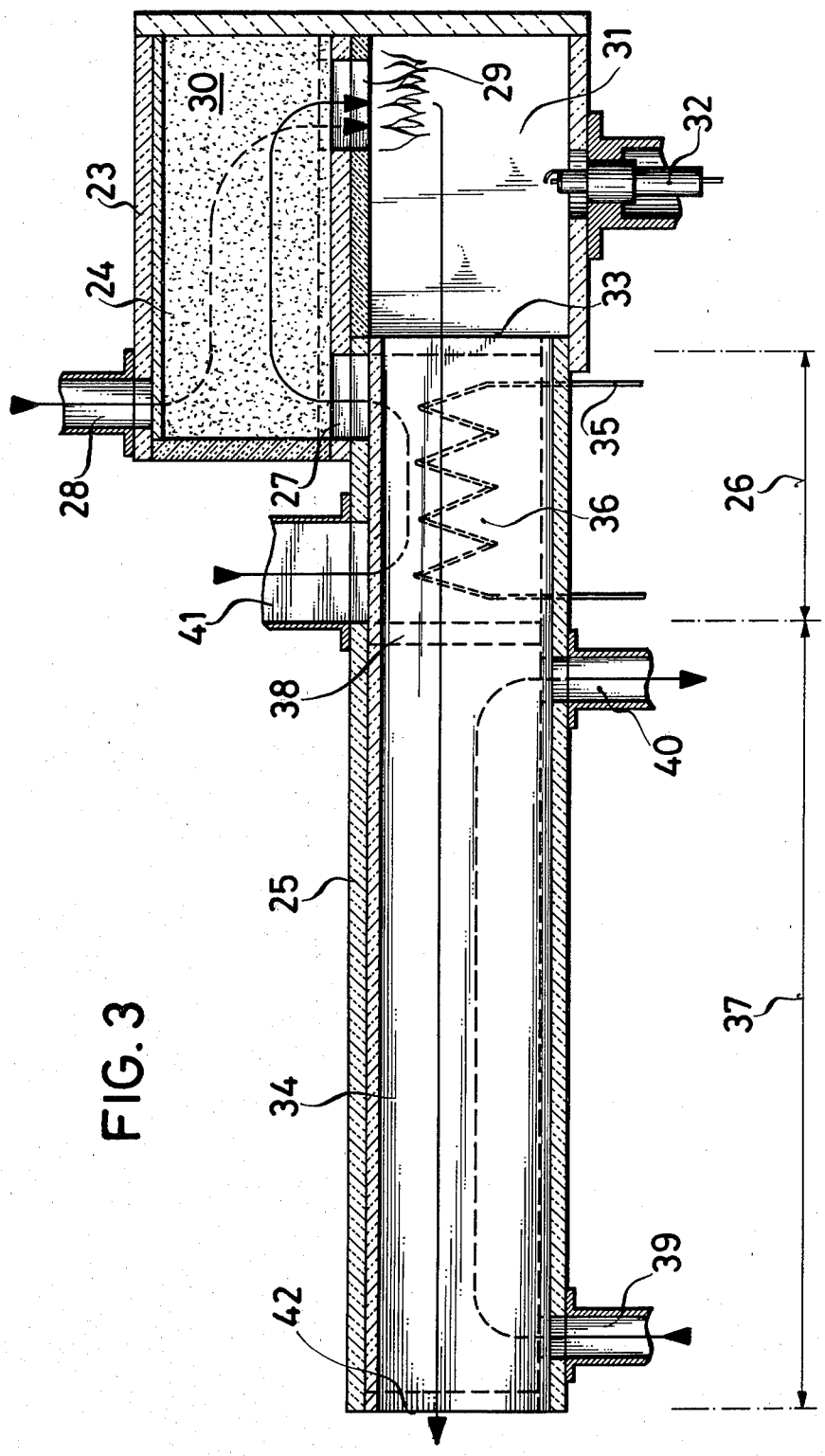
FIG. 3 is a section similar to FIG. 1 through a device utilizing a burner head for liquid fuel and means for preheating the air serving as the combustion sustaining or oxidizing agent for the fuel.

In the embodiment shown in FIG. 3, the ceramic burner head 23 is provided for liquid fuels (see the aforementioned copending application). With respect to the supply of the air and the fuel to this burner head, a similar construction to that described in connection with FIGS. 1 and 2 and the burner head has a multiplicity of parallel passages of a slit-shaped cross section. In FIG. 3 one of the air passages 24 is shown in cross section and the walls separating the passages of the burner head can be porous to allow the liquid fuel to permeate therethrough and evaporate on the inner surfaces of the air passages when the fuel comes into contact with the heated combustion air.

The burner head is offset from the recuperator block 25 but so connected to it that air introduced at 41 is delivered to slit-like passages of the recuperator block to be preheated in counterflow to the combustion gases and then is fed directly via the passages 27 to the air channels 24 of the burner head. The fuel is supplied via pipe 28 to the fuel passages of the burner head and the fuel/air mixture is delivered via passage 29 to the combustion chamber. As indicated, the porous walls 30 permit liquid fuel penetrating through these walls to vaporize so that a gaseous mixture is introduced into the combustion chamber 31 where it is ignited by the electrodes 32.

In the manner already described in connection with FIGS. 1 and 2, the hot combustion gases pass through the inlet end 33 of the recuperator block and, more particularly, through the slit-like passages 34 therein.

The exhaust gases are discharged at the opposite end 42 of the ceramic recuperator.

The recuperator block is subdivided into a preheating zone 26 and a main heating zone 37. In the preheating zone an electric resistance heater 35 can also be provided to raise the temperature of the air to an appropriate level for vaporization of the fuel on cold start of the apparatus, i.e. when hot combustion gases are not yet available. When combustion begins, the resistance heater, which can be simply nichrome or like wires in the air passages, is cut off and the air is heated by indirect counterflow heat exchange from the combustion gases traversing the passages not shown which alternate with the gas passages 34.

Instead of heating wires within the air passage, the partitions or walls defining the air passages may be electrically conductive, e.g. by the use of a ceramic of silicon carbide, so as to constitute electrical resistance heaters themselves, opposite portions of each wall being connected to an appropriate electric current source.

The slit-like passages between the gas passages 34 are subdivided by the partitions 38 to set off the second zone 37 from the preheating zone 26. The heat exchange zone 37 can serve for the heating of circulatable heating water or utility water. The water passages and the air preheating passages register with one another and would be continuous except for the partitions 38.

The water to be heated is introduced by an inlet 39 and is discharged at an outlet 40. Any condensate forming in the hot gas passages of the unit of FIG. 3 simply is discharged at the left-hand end thereof.

Figure 4:
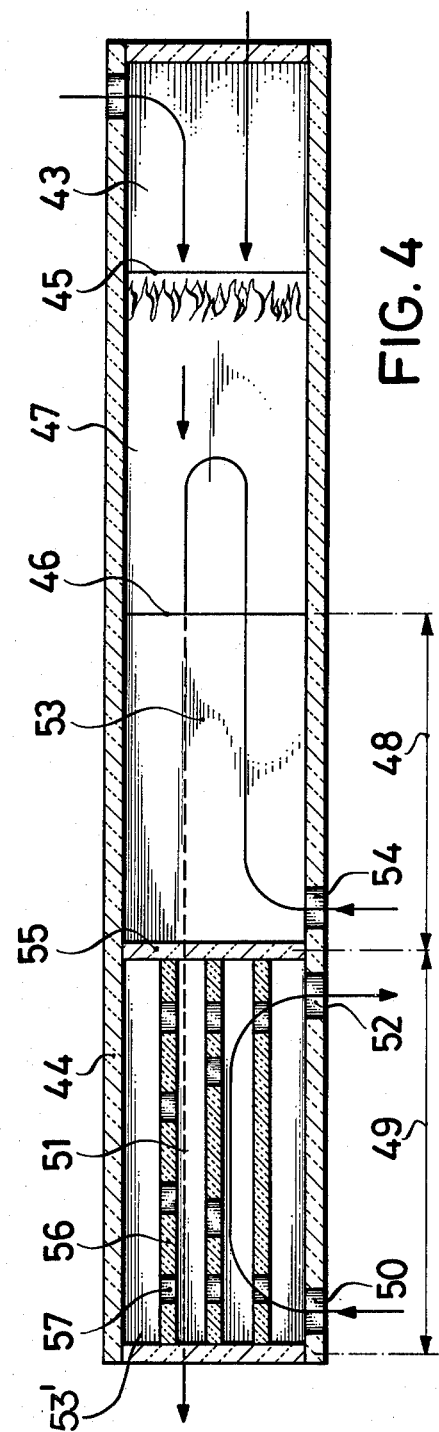
FIG. 4 is another longitudinal section through an embodiment of the invention which can be utilized for dangerous gas burning.

The embodiment of FIG. 4 is a device for the burning of dangerous, toxic or noxious gases and also is in a form of a unitary ceramic block with a burner 43, a recuperator 44 and a combustion chamber 47 between the mouth 45 of the burner 43 and the inlet 46 at which the hot gases enter the recuperator. With respect to the shapes of the passages in the burner and the recuperator, reference may be had to FIGS. 1 and 2.

A gaseous fuel and air are fed to the separated passages of the burner head 43 and form a combustible mixture as described in connection with FIGS. 1 and 2. The combustion gases formed in the combustion chamber 47 enter the recuperator body and flow through slit-like passages therein to the left-hand or discharge side.

The recuperator 44 is here also formed with two zones, the first being a preheating zone 48 for the dangerous gas to be burned while the other zone 49 is a water heating zone, the two zones being separated by partitions 55 in the common flow channels.

The dangerous gas is introduced through an inlet 54 adjacent the partitions 55 to alternate flow passages one of which is seen in section at 53, the gas being heated by indirect heat exchange in counterflow to the hot gases passing through the flanking channels. The dangerous gas then enters the combustion chamber 47 where it burns and forms part of the hot exhaust gas which is discharged through the hot gas passages as represented by the broken line arrow in FIG. 4. The preheated gas to be burned thus is discharged toward the advancing flame front at the mouth 45 of the burner head 43 and uniformly across the flame front in a distribution affording particularly high efficiency of combustion. The efficiency is especially high for a small burner volume when the mouth 45 and the inlet 46 have substantially the same number and pattern of flow passages and total cross-sectional area.

The second zone 49, downstream of the partitions 55, has flow passages 53; which are extensions of the passages 53 but which are spanned by supports 56 for the partitions defining these passages. The supports 56 are provided with apertures 57 at least in the region of the water inlet 50 and water outlet 52 to permit water to flow through the passages 51 and being heated in the manner described. Supports 56 are also inserted in the flow channels 53. The supports allow the water pressure to greatly exceed the gas pressure in the adjacent passages. This unit can deliver at least several kilowatts of power in the heating of water while burning dangerous gases for a total unit length of 50 cm.

We claim:
1. A heating unit comprising:
a ceramic burner body formed with a plurality of parallel slit-like passages at least some of which open at a side of said body;
means for supplying a fuel to alternate ones of said passages of said burner body and for supplying a combustion-sustaining gas to the remainder of said passages whereby a combustible gas mixture is formed at said side of said body;
means defining a combustion chamber at said side of said body and into which said some of said openings discharge whereby hot combustion gases are formed in said combustion chamber;
a ceramic recuperator body constituting a unitary ceramic structure with said ceramic burner body and said means defining said combustion chamber, said recuperator body being formed with mutually parallel slit-like channels, alternate ones of said channels communicating with said combustion chamber for conducting said hot combustion gases therefrom; and
means for passing a fluid to be heated through others of said channels in a direction counter to the flow of said combustion gases for heat exchange between said fluid and said combustion gases through walls of said recuperator body between said channels.

2. A heating unit comprising:
a ceramic burner body formed with a plurality of parallel slit-like passages at least some of which open at a side of said body;
means for supplying a fuel to alternate ones of said passages of said burner body and for supplying a combustion-sustaining gas to the remainder of said passages whereby a combustible gas mixture is formed at said side of said body;
means defining a combustion chamber at said side of said body and into which said some of said openings discharge whereby hot combustion gases are formed in said combustion chamber;
a ceramic recuperator body formed with mutually parallel slit-like channels, alternate ones of said channels communicating with said combustion chamber for conducting said hot combustion gases therefrom;
means for passing a fluid to be heated through others of said channels in a direction counter to the flow of said combustion gases for heat exchange between said fluid and said combustion gases through walls of said recuperator body between said channels, said ceramic burner body, said recuperator body and the means forming said combustion chamber being part of a unitary ceramic structure; and insulating layers of porous ceramic material lining said combustion chamber.

3. A heating unit comprising:

a ceramic burner body formed with a plurality of parallel slit-like passages at least some of which open at a side of said body;

means for supplying a fuel to alternate ones of said passages of said burner body and for supplying a combustion-sustaining gas to the remainder of said passages whereby a combustible gas mixture is formed at said side of said body;

means defining a combustion chamber at said side of said body and into which said some of said openings discharge whereby hot combustion gases are formed in said combustion chamber;

a ceramic recuperator body formed with mutually parallel slit-like channels, alternate ones of said channels communicating with said combustion chamber for conducting said hot combustion gases therefrom;

means for passing a fluid to be heated through others of said channels in a direction counter to the flow of said combustion gases for heat exchange between said fluid and said combustion gases through walls of said recuperator body between said channels, said ceramic burner body, said recuperator body and the means forming said combustion chamber being part of a unitary ceramic structure; and said recuperator body is subdivided into zones and a first of said zones proximal to said combustion chamber for heating by said combustion gases and a second fluid is passed through a second of said zones downstream of said first zone for heating by said combustion gases.

4. The unit defined in claim 3 wherein said first fluid is air and said air is preheated in said first zone before entering respective passages in said burner body as said combustion-sustaining gas.

5. The unit defined in claim 4 wherein said fuel is a liquid fuel and the walls between said passages in said burner body are porous enabling the liquid fuel to penetrate said walls and evaporate in the air passages.

6. The unit defined in claim 4, further comprising electrical resistance heating means for heating air in channels of said recuperator body in said first zone prior to the generation of hot combustion gases.

7. The unit defined in claim 3 wherein water is heated in said second zone.

8. The unit defined in claim 7 wherein supports are provided in channels of said second zone on the gas and or on the fluid side to enable the generation of substantial pressure differentials between gas- and water-carrying channels of said second zone.

9. The unit defined in claim 7 wherein water is heated in said first zone, the water heated in said first zone as said first fluid being a heating fluid for space heating, the water heated in said second zone as said second fluid being hot water for utility purposes.

10. The unit defined in claim 9, further comprising baffles in water-carrying channels of said first zone proximal to said combustion chamber for deflecting the water flow along an increased path length.

11. The unit defined in claim 8 wherein said supports are provided with openings enabling water to flow past said supports.

12. The unit defined in claim 7 wherein said first zone is used to heat a dangerous gas to be burned, further comprising means for feeding said dangerous gas to channels of said first zone as said first fluid, the latter channels communicating with said combustion chamber to discharge preheated dangerous gas into said combustion chamber.

13. The unit defined in claim 12 wherein said burner body generates a flame front along said side, said channels being uniformly distributed across said flame front.

* * * * *